United States Patent [19]
Levinson

[11] 3,985,990
[45] Oct. 12, 1976

[54] MICROWAVE OVEN BAKING UTENSIL

[76] Inventor: Melvin L. Levinson, 1 Meinzer St., Avenel, N.J. 07001

[22] Filed: Dec. 3, 1974

[21] Appl. No.: 529,052

Related U.S. Application Data

[60] Continuation-in-part of Ser. Nos. 400,416, Sept. 24, 1973, Ser. No. 391,146, Aug. 23, 1973, Pat. No. 3,854,023, and Ser. No. 325,330, Jan. 22, 1973, Pat. No. 3,881,027, said Ser. No. 400,416, and Ser. No. 391,146, each is a continuation-in-part of Ser. No. 381,182, Aug. 16, 1972, abandoned, said Ser. No. 325,330, is a division of Ser. No. 193,940, Oct. 29, 1971, Pat. No. 3,731,037.

[52] U.S. Cl. .......................... 219/10.55 E; 99/425; 219/10.55 M; 426/243
[51] Int. Cl.² ............................................. H05B 9/06
[58] Field of Search ............. 219/10.55 E, 10.55 R, 219/10.55 M; 126/390; 426/241, 234, 243; 99/425

[56] References Cited
UNITED STATES PATENTS

| | | |
|---|---|---|
| 2,495,435 | 1/1950 | Welch .......................... 219/10.55 E |
| 2,600,566 | 6/1952 | Moffett ........................ 219/10.55 E |
| 2,622,187 | 12/1952 | Welch .......................... 219/10.55 E |
| 2,714,070 | 7/1955 | Welch .......................... 219/10.55 E |
| 3,230,864 | 1/1966 | Krajewski ...................... 219/10.55 E |
| 3,271,169 | 9/1966 | Baker et al. ................... 219/10.55 E |
| 3,539,751 | 11/1970 | Levinson ....................... 219/10.55 E |

Primary Examiner—Bruce A. Reynolds

[57] ABSTRACT

A heating utensil for microwave heating comprising a first microwave-reflective body with an obverse surface which limits the depth of penetration of mirowave energy into an oven load when said load is located thereon and with a reverse surface to said obverse surface which mates with a second microwave-reflective body to form a microwave shielded by-product collection chamber, microwave-non-permeable, liquid-permeable connecting means between said obverse surface and said reverse surface and where said utensil can include a microwave-permeable means for said obverse surface to form a baking chamber and where said utensil can include a heat-insulating outer container.

16 Claims, 3 Drawing Figures

MICROWAVE OVEN BAKING UTENSIL

CROSS-REFERENCE TO RELATED APPLICATIONS

This application is a continuation-in-part application of my copending applications U.S. Ser. No. 400,416, filed Sept. 24, 1973, U.S. Ser. No. 391,146, filed Aug. 23, 1973 now U.S. Pat. No. 3,854,023, which are continuation-in-part applications of U.S. Ser. No. 281,182, filed Aug. 16, 1972 now abandoned. The application is a continuation-in-part application of my copending application U.S. Ser. No. 325,330, filed Jan. 22, 1973, now U.S. Pat. No. 3,881,027, which is a division of my U.S. Ser. No. 193,940, filed Oct. 29, 1971 now U.S. Pat. No. 3,731,037.

BACKGROUND OF THE INVENTION

This invention concerns a utensil designed for microwave cooking. To achieve the versatility in microwave cooking that is expected in gas and electric cooking, a microwave oven must be supplied with as many different type and size cooking utensils as are available for gas and electric cooking. Microwave oven cooking utensils should be specially designed to capitalize on microwave energy's special characteristics and desirable cooking features. Numerous novel cooking containers have already been developed for microwave cooking, for example, my U.S. Pat. Nos. 3,539,751, 3,701,872, 3,731,037, 3,854,023, 3,881,027 and 3,777,099 and my copending related application U.S. Ser. No. 400,146.

My copending related application U.S. Ser. No. 400,416 and U.S. Pat. Nos. 3,854,023 and 3,881,027 teach using the latent heat of vaporization evolved from selectively heating one part of a food to heat a second part of a food. My U.S. Pat. Nos. 3,701,872 and 3,777,099 teach ways of shielding condensed water and rendered by-products from further heating in a microwave oven in competition with a heating article and so needlessly waste power. Others, as in U.S. Pat. No. 3,230,864, have described apparatus which shield by-products from microwave exposure so as not to needlessly waste microwave power heating said by-products during said exposure. This invention teaches how to trap evolved water vapor while trapping by-products and how to condense said water vapor to return its latent heat of vaporization to the heating system. Other improvements and novel combinations will become evident in what follows.

BRIEF SUMMARY OF THE INVENTION

A utensil for microwave cooking is described which (1) provides selective heating by microwave exposure of a first portion of a foodstuff and (2) contains the heated vapor and heat rendered by-products from said heating first portion within a microwave shielded container beneath said foodstuff. Said heated vapor is condensed to water within said shielded container and the latent heat of vaporization from said condensed water is reclaimed beneath the food, to heat said food and said by-products.

DESCRIPTION OF THE PREFERRED EMBODIMENTS

Figure 1:
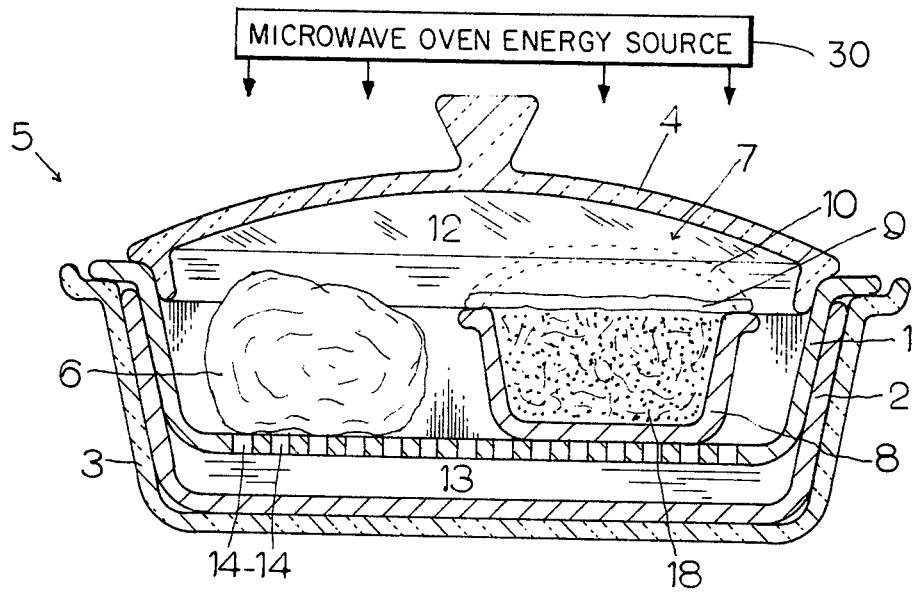
FIG. 1 is a cross section of one embodiment of the invention for use in a microwave oven (not shown).

FIG. 1 illustrates a metal baking utensil 5 for use within a microwave oven (not shown) where a first, microwave-reflective, heat-conductive, perforated, shallow container 1 is supported within a second, microwave-reflective, heat-conductive, rin-and-side-wall-mating, non-perforated, deep container 2. First conductor 1 is covered by a microwave-permeable lid or cover 4. Second container 2 resides within a third, electrically-insulating, heat-insulating container 3.

Within baking chamber 12, defined by first container 1 and cover 4, is both foodstuff 6 and a small pie 7. Pie crust 9 protrudes from metal pie plate 8, above pie filling 18, in a manner well known. Perforations 14—14, in shallow container 1, are constructed in a manner well known (e.g. small enough to block the passage of microwave energy therethrough and large enough to permit the free passage of steam and rendered by-products). A microwave-shielded, by-product, condensation chamber 13 is formed between shallow container 1 and deep container 2.

A physical example of baking utensil 5 and its operation follows: Container 1, a shallow-well, perforated, aluminum pie plate is nested into container 2, a mating, deep-well, aluminum pie plate, which is, in turn, nested into container 3, a paper pie plate. A foodstuff 6, as raw chicken or potato, or a foodstuff 7, as a raw pie in an aluminum pie plate, or both together are placed on the perforated, bottom surface of container 1 and covered by cover 4, a pyrex lid. Baking utensil 5 is then subjected to microwave radiation within a microwave oven (not shown) for a predetermined time or until the food viewed through Pyrex lid 4 is heated properly. The heating of foodstuff 6 and pie 7 is more fully explained in my copending related application, U.S. Ser. No. 400,416 and U.S. Pat. No. 3,854,023, where a first portion of a food in contact with a metal container is shielded from microwave radiation and a second portion of said foot remote from said metal container receives said microwave radiation to become the heating element for said first shielded portion. Said another way, the exposed surface of a food is spot and selectively heated by microwave radiation in a manner similar to that by which said exposed surface of said food would spot and selectively heat if said food in said metal container was heated directly, by infra-red radiation, beneath a gas or electric heating element. In all three cases, gas, electric and microwave, the reverse surface of said exposed surface of said food is shielded from direct exposure and must be turned over to receive direct exposure. The only recognizable difference, between gas, electric or microwaves, appears to be that the result by microwaves has been considered to be more flavorful, as the browning and crusting of thicker portions of a food is deeper. Container 3's heat-insulating properties contain heat within baked chamber 12 longer and result in higher system efficiency. Container 3's electrical-insulating properties practically preclude electrical arcing between metal containers 1 and 2 and electrically-conductive metal oven walls or other electrically-conductive objects within the microwave oven.

A comparison of this invention and my previous inventions, copending related application, U.S. Ser. No. 400,416 and U.S. Pat. No. 3,854,023, follows: In this invention liquid by-products and condensed water are not allowed to accumulate around the base of foodstuff 6 (such accumulation could make certain food undesirably soggy). In both inventions, steam, that evolves from foodstuff 6 and condenses on the metal beneath foodstuff 6 and changes to water, releases, through condensing, latent heat of vaporization to foodstuff 6. In my previous invention, said condensed water was purposefully recycled by the capillary action of a porous material which transported said water to an area exposed to microwave energy (whence microwave energy vaporized said water and as recycled steam basted and heated cool portions of foodstuff 6). In this invention, condensed water is trapped and not recycled. By not recycling condensed water, a hotter, dryer-heat, baking condition is achieved and food browns and crusts more effectively in less time. For example, without recycling water a cooked chicken piece tastes more roasted than broiled. In my previous invention, during the cooking process, microwave energy divides between heating an area of food exposed to microwave energy and heating condensed water. In this invention, the condensed water is shielded and the microwave energy does not divide but expends its power in one portion of a food. Both inventions capitalize on the heat conducting and microwave shielding properties of metal utensils. Solid food by-products, rendered by exposure of a food to microwave energy, are generally cool and, if not heated by further exposure to microwave energy, represent no serious heat loss to the heating system. But, the escape of hot vapor and steam from baking utensil 5 is a serious heat loss. Observing the amount of steam escaping from baking utensil 5 is a good way to fortell either the timely end of a cooking procedure or that too high a power level is being employed.

Figure 2:
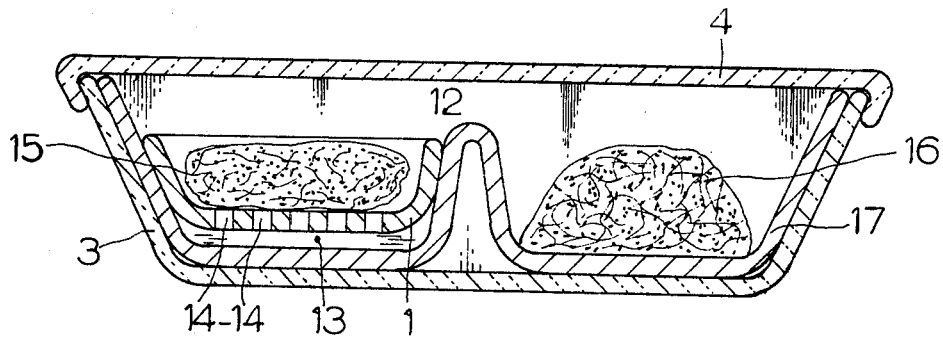
FIG. 2 is a cross section of another embodiment of the invention combined with the invention of my copending related application U.S. Ser. No. 400,416 and U.S. Pat. No. 3,854,023.

This invention and my previous invention in my copending related application, U.S. Ser. No. 400,416 and U.S. Pat. No. 3,854,023 are compatible and can exist side by side each acting individually to produce a combined result. For example, each invention can be employed to assist in the heating of at least one individual portion of a multiportion meal. FIG. 2 illustrates two dissimilar foodstuffs; foodstuff 15 is over the configuration of this invention and foodstuff 16 is over the configuration of said previous inventions. Note that container 17 is container 2 of FIG. 1 under foodstuff 15 and, at the same time, the metal obverse surface of my previous inventions under foodstuff 16. On option, container 17 can either be compartmented or not or can form two, metal, heating-utensils within chamber 12, one utensil for foodstuff 15 and a second utensil for foodstuff 16 (not shown). The heating members of my copending related application, U.S. Ser. No. 400,416 and U.S. Pat. No. 3,854,023, (e.g. an open or closed, heat-insulating, liquid-permeable container containing a metal, microwave-shielding food receiving surface) can be used in their entirety resting directly on container 1 within baking chamber 12 (not shown).

Metal pie plate 8, in FIG. 1, illustrates that metal baking utensil 5 can usefully accept a third metal cooking container directly on first container 1 within baking chamber 12. Chamber 12 must be tall enough to permit pie crust 9 to rise, on baking, to position 10. Metal pie plate 8 can have its bottom removed and still have utility shielding the side of a hamburger from edge heating (not shown).

Sufficient food (e.g. load) is advisable to absorb sufficient microwave power and thereby reduce the possibility of any metal to metal arcing to a minimum and assure that accidental electric arcs will be of such low power as not to pit or damage. Surprisingly, during the many trials of this invention, no electric arcs were observed. Large metal surfaces in intimate contact, no sharp metal points, the water vapor present and the large mass of food all seem to preclude undesirable electric arcing.

Baking utensil 5 can be constructed out of heavy metal for containers 1 and 2 and glass and/or ceramic for lid 4 and be reusable or can be constructed out of light material as aluminum foil or aluminum foil covered for containers 1 and 2 and high temperature plastic film and/or paper material for lid 4 and container 3 and be made disposable.

Chamber 13 can be filled with absorbent material to simplify the disposal of accumulated waste products. For example, (1) unfinished material as paper toweling or finished material as a paper plate or (2) a combination of materials, as in the construction of disposable diapers for babies (where a porous layer of plastic overlays cotton fibre wadding supported on a non-porous plastic sheet) can be used (not shown).

Figure 3:
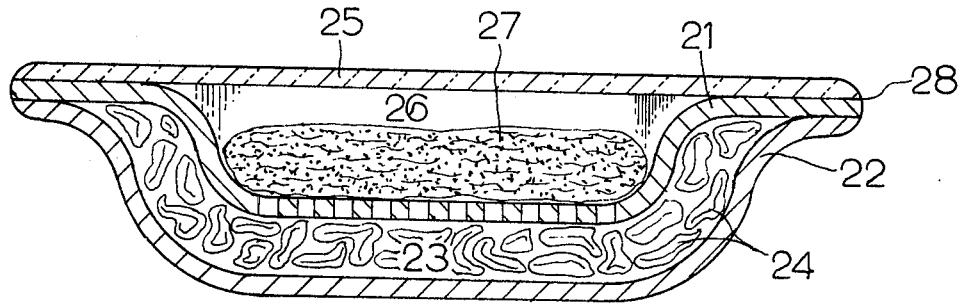
FIG. 3 is another embodiment of the invention designed to accommodate irregular shaped edge-heating articles.

Certain foods tend to edge heat, for example, thin irregular meat portions when heated unaided in a microwave oven. To heat said edge heated type foods, in FIG. 3, a disposable package of an upper, aluminum, perforated foil 21 is edge attached to a lower, non-perforated, aluminum foil 22 and forms a by-product collection chamber 23 therebetween. By-product chamber 23 is filled with a fluffy, compressable, absorbent filling 24, as down, to operate as a soft pillow. Covering upper foil 21 and anchored to its periphery 28 is a high temperature plastic film 25, of the type (ex. nylon or polyester plastic) now commonly in use to brown and crust food in, in an electric oven. Plastic film 25 and aluminum foil 21 form baking chamber 26. Within baking chamber 26 is foodstuff 27, for example, a thin irregular flat meat portion. Note that because of said pillow effect, perforated aluminum foil 21 follows the under and side contours of foodstuff 27. The operation of FIG. 3 is similar to the operation described for FIG. 1 with the exception that microwaves can not enter foodstuff 27 from its sides and so add to microwaves entering from the top to cause an undesirable concentration of power to occur in the edge of the food. Low-temperature-melting plastic seals, blow out plugs or the like (not shown) should be employed to prevent an explosive build up of steam.

In operation, a food is selectively heated and so dried by exposure to microwave energy and the hot vapor evolved from said drying is trapped to create a hot-steam, heat-insulating blanket encompassing said food. Microwaves continue to heat said selectively-heated, drying section of said food above the temperature of said hot-steam, heat-insulating blanket. Temperatures in the dried area easily reach baking and browning temperatures, circa 350°–450° F. Similar to gas and electric heating, if microwave heating is not timely terminated, useful browning and crusting can continue to undesirable char which can ignite in the presence of oxygen.

It should be noted that baking utensil 5 has added utility in the serving and eating interval as the rendered by-products have been heated by condensing steam and constitute a heat reservoir which can maintain a heated food hot long after an exposure to microwave energy. In effect, the common metal baby dish with its compartment of hot water underneath the food is duplicated for use during a serving and eating interval.

Container 2, without container 3, can be employed on an oven's glass or ceramic shelf (not shown). Then, the resultant heat differential between the exposed, heating-drying area of the food and the shielded area of said food will be greater because of the cooling action of said shelf. Also, without container 3, the bare metal of container 2 can be used directly on the bare cool metal of an oven's floor to result in an even greater heat differential as said cool, metal oven floor readily conducts heat away from metal container 2. While the last two examples may result in a longer time for a food to reach an average heat, than if container 3 was employed, these latter procedures are valuable methods of increasing top surface crusting or browning in relation to a desired internal food temperature. In other words, a cook can vary results by choosing when and where to employ lid 4 and/or container 3 in combination with essential container 1 and container 2. Once a microwave cook understands the basic structure and function of my microwave oven baking utensil, the purpose and results will vary with the type, quantity of food and desire of said cook.

Caution, two metal conductors separated by a poor electric insulator are counterindicated in this invention. Poor electric conductors can break down and unwanted electric arcing can occur. For example, a container 3, of poor electric insulating properties is perfectly suitable for use on a glass oven shelf, but unsuited for use directly on a bare metal oven floor. A container 3 of good electrical insulating properties is suitable for direct use on a bare metal oven floor. Container 1 and container 2 can be an integral unit and can be made disposable. Container 1 and container 2, made disposable, can be aluminum film on cardboard paper (said aluminum films are edge fastened and form the outer walls and said paper forms the inner walls of chamber 13) constructed to avoid creating two isolated (for microwaves) metal conductors separated by a poor electrical insulator.

By-product collection, where said by-products are valuable, is enhanced by baking utensil 5. Containers 1 and 2 can be permanently attached and provided with an access port to permit the removal of by-products and/or clean up of chamber 13 (not shown). In FIG. 1 on perforated container 1, metal pie plate 8 can be perforated (not shown).

Varying the size of the baking utensil and the material and/or design of its cover or lid 4 can be employed to vary the results. For instance, lid 4 can be concave forming an arc over the food and heavy as illustrated in FIG. 1, flat and light weight as illustrated in FIG. 2 or lid 4 can be convex above the food (not shown). Where concave, water-condensation-run-off lands in chamber 13. Where convex, water-condensation-run-off lands on heating food. By special convex, off center design, said run-off could be directed onto a particular portion of a multiportion heating dinner. If said lid accumulates water condensation, microwave energy must penetrate said water to reach the heating food resulting on more steam recycling The size of the baking utensil in relation to the size of the food that is heating is important. For instance, a small amount of food heated in a large baking utensil, on reaching a desired temperature, is dryer than if said small amount of food was heated in a smaller baking utensil. As with small and large pots and pans for gas and electric heating, a set of small and large baking utensils are in order for microwave cooking, not only to accomodate different size portions but, as stated, to control dryness. The gourmet chef will require an assortment of different lids and will have to acquire new skills to capitalize on the versatility afforded by my microwave oven baking utensil.

Although this invention has been described with a certain degree of particularity it is understood that the present disclosure has been made only by way of example and that numerous changes in the details of construction and arrangement of parts may be resorted to without departing from the spirit and scope of this invention.

I claim:

1. For use in the heating of an article in a microwave oven, an improved heating member comprising:

a microwave-reflective first body with at least one heat-conductive section where said section is bounded by an obverse surface and a reverse surface and where said obverse surface is designed to receive said article essentially in contact thereon and thereby partially shield, from exposure to microwave energy, an adjacent first portion of said article while said exposure to microwave energy heats a second portion of said article remote from said obverse surface, a microwave-reflective second body which connects with said reverse surface of said first body to form a microwave-shielded, steam-condensing chamber therebetween, a microwave-permeable, steam-confining third body which connects with said obverse surface to form a steam confining, heating chamber therebetween, and a microwave-non-permeable, steam-permeable means connecting said steam-confining chamber to said steam-condensing chamber.

2. An improved heating member, according to claim 1, which includes:

access means to said microwave-shielded, steam-condensing chamber.

3. An improved heating member, according to claim 1, which includes:

removable means for containing by-products, released by said article when heated, within said steam condensing, microwave-shielded chamber independent of said second body.

4. An improved heating member, according to claim 1, which includes:

where said section is flexible, a compressible, flexible material within said steam-condensing chamber supporting said flexible section so that, when said article resides in contact with said obverse surface, said obverse surface follows the adjacent contour of said article.

5. An improved heating member, according to claim 4, which includes:

where said section is aluminum foil.

6. In a method of heating an article by exposing said article to microwave energy, the steps which include:

locating said article in proximetry with at least one side of a microwave-reflective, heat-conductive body designed to partially shield a first portion of said article from microwave energy while said microwave energy heats a second portion of said article, exposing said article to microwave energy to evaporate hot vapor from said second portion of said article, collecting and condensing to liquid said hot vapor within a microwave shielded chamber thereby releasing said hot vapor's latent heat of vaporization, conducting via said heat-conductive body said released heat to said first portion of said article, and containing and shielding from further exposure to microwave energy said liquid.

7. For use in heating an irregular, flat article in a microwave oven, an improved heating member which comprises:

a first body with at least one microwave-reflective, flexible section where said section is bounded by an obverse surface and a reverse surface and where said obverse surface is disposed to receive said article essentially in contact thereon, a second body which abuts said reverse surface of said first body to form a cavity therebetween, and a compressible, flexible material within said cavity to support said flexible section so that when said obverse surface receives said article, said obverse surface is free to follow and support the adjacent contour of said article.

8. For use in the heating of an article by exposing said article to microwave energy, an improved heating member comprising:

a microwave-reflective first body with at least one section where said section is bounded by an obverse surface and a reverse surface and where said obverse surface, when said article is located essentially in contact thereon, partially shields, from exposure to microwave energy, an adjacent first portion of said article while said exposure to microwave energy heats a second portion of said article remote from said obverse surface, a microwave reflective second body which connects with said reverse surface to form a microwave-shielded, vapor-condensing chamber therebetween, a microwave-permeable, at least partially steam-impermeable third body which connects with said obverse surface to form, therebetween, a heating chamber to enclose said article, and microwave-non-permeable means connecting said heating chamber with said vapor-condensing chamber.

9. An improved heating member, according to claim 8, which includes:

a heat-insulating member exterior said second body and, enclosing said second body to impede heat loss therefrom, which will limit the amount of vapor which will condense on the interior walls of said second body and thereby will maximize the amount of vapor available to condense on said first body to heat said article via said first body.

10. An improved heating member, according to claim 9, which includes:

a microwave-reflective, heat-conductive container within said heating chamber where at least a portion of said steam-permeable means, between said heating chamber and said shielded chamber, is not closed by said container.

11. An improved heating member, according to claim 8, which includes:

sealable access means to said heating chamber.

12. For use in heating a plurality of different articles in a microwave oven, an improved heating enclosure comprising:

a microwave-reflective first body with at least a first and a second section where said first section is bounded by a first obverse surface and a first reverse surface and where said second section is bounded by a second obverse surface and a second reverse surface, a microwave-reflective second body which is bounded by a third obverse surface and a third reverse surface, where said second and third obverse surfaces, when said different articles are respectfully located thereon, partially shields, from exposure to microwave energy, adjacent first portions of said articles while said microwave energy heats second portions of said articles, where said obverse surface connects with said third reverse surface to form a microwave-shielded chamber therebetween, microwave-non-permeable, steam-permeable means connecting said third obverse surface with said third reverse surface, a microwave-permeable member which is at least partially liquid absorptive disposed to absorb liquid condensation from said second reverse surface and transfer said liquid condensation to a location exposed to microwave energy, and where said enclosure confines steam therein.

13. A microwave heating utensil comprising:

a condensation chamber formed of microwave-reflective material and having an outer steam-permeable, heat-conducting surface for supporting, essentially in contact thereon, a food product, and a cover covering at least the outer food supporting surface of said condensation chamber, said cover being steam impermeable to impede the escape of steam from said utensil.

14. A microwave heating utensil comprising:

an outer container, a steam-confining cover enclosing said outer container, a tray for supporting, essentially in contact thereon, a food product, said tray being made of a heat-conductive, microwave-reflective material, and means supporting said tray above the bottom surface of said container whereby steam generated by microwave energy will condense at least partially on the bottom of said tray.

15. A microwave heating utensil, comprising:

a first tray, a second tray made of a heat-conductive, microwave-reflective material and having a steam-permeable surface for receiving a food product essentially in contact thereon, means supporting said second tray with respect to said first tray with said steam-permeable surface spaced from the bottom of said first tray to form a chamber therebetween which is at least partially microwave shielded, and a microwave-permeable, steam-confining cover enclosing said steam-permeable surface.

16. A microwave heating utensil comprising:

an outer container,
a steam-confining cover enclosing said outer container,
a tray made of a heat-conductive, microwave-reflecting material,
means supporting said tray above the bottom surface of said outer container whereby steam generated by microwave energy will condense at least partially on the bottom of said tray,
a microwave-reflective, heat-conductive, inner container, for supporting an article, located on said tray, and
where said microwave-reflective, inner container is designed so that microwave energy can heat at least one surface of said article.

* * * * *

UNITED STATES PATENT AND TRADEMARK OFFICE
CERTIFICATE OF CORRECTION

PATENT NO. : 3,985,990
DATED : October 12, 1976
INVENTOR(S) : Melvin L. Levinson It is certified that error appears in the above–identified patent and that said Letters Patent are hereby corrected as shown below:

Col. 2, line 13, delete "rin" add ... rim ...

Col. 2, line 47, delete "foot" add ... food ...

Col. 3, line 24, delete "broiled" add ... boiled ...

Col. 4, line 19, after "ered" add ... paper ...

Col. 8, line 22, before "obverse" add ... first ...

Signed and Sealed this

Twenty-fifth Day of January 1977

[SEAL]

Attest:

RUTH C. MASON
*Attesting Officer*

C. MARSHALL DANN
*Commissioner of Patents and Trademarks*